United States Patent [19]

Chiang Shiung-Fei

[11] Patent Number: 4,895,376
[45] Date of Patent: Jan. 23, 1990

[54] INTERACTIVE VIDEO GAME

[75] Inventor: Joseph J. Chiang Shiung-Fei, Kowloon, Hong Kong

[73] Assignee: Tigers Electronics, Inc., Vernon Hills, Ill.

[21] Appl. No.: 208,239

[22] Filed: Jun. 17, 1988

[51] Int. Cl.$^4$ .................. A63B 67/00; A63F 7/06
[52] U.S. Cl. .................. 273/313; 273/1 E; 273/85 G; 273/316; 273/DIG. 28; 273/85 R; 434/45; 434/69; 434/55; 340/727; 272/1 C; 272/1 B
[58] Field of Search .................. 273/1 E, 85 G, 313, 273/316, DIG. 28, 148 B; 272/17, 18, 1 C; 434/45, 55, 69; 340/727

[56] References Cited

U.S. PATENT DOCUMENTS

| | | | |
|---|---|---|---|
| 4,461,470 | 7/1984 | Astroth et al. | 273/85 G |
| 4,478,407 | 10/1984 | Manabe | 434/45 |
| 4,527,980 | 7/1985 | Miller | 272/1 C |
| 4,580,782 | 4/1986 | Ochi | 273/1 E |
| 4,582,323 | 4/1986 | Minkoff et al. | 273/85 G |
| 4,710,129 | 12/1987 | Newman et al. | 273/DIG. 28 |

*Primary Examiner*—Anton O. Oechsle
*Assistant Examiner*—Jessica J. Harrison
*Attorney, Agent, or Firm*—Dressler, Goldsmith, Shore, Sutker & Milnamow, Ltd.

[57] ABSTRACT

An interactive game includes a housing with a first part and a second part. The first part is moveable with respect to the second part and carries a liquid crystal display. Switches provide electrical signals indicating the position of the first part with respect to the second part. A microcomputer connected to both the display and the switches is programmed to generate electrical signals to produce a moving image on the display. Movement of the first part of the housing with respect to the second part moves the display and the images thereon in a consistent fashion. A manually operable switch is provided to generate hit indicating events under operator control. When the images enter a target region they may be obliterated from the display by a manually generated hit indicating event.

55 Claims, 12 Drawing Sheets

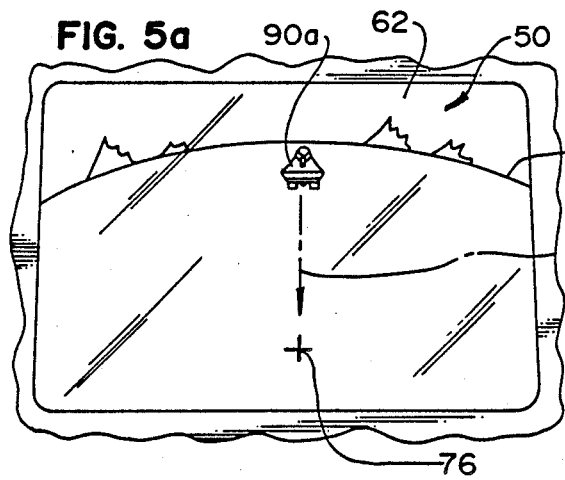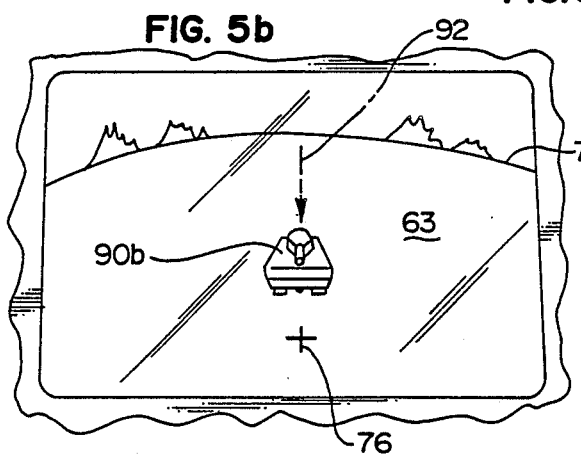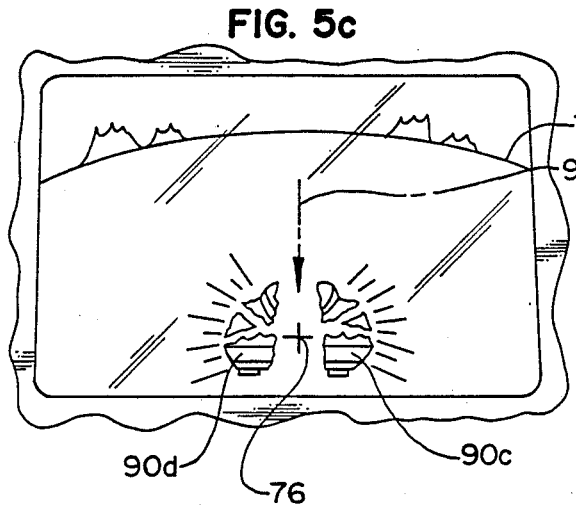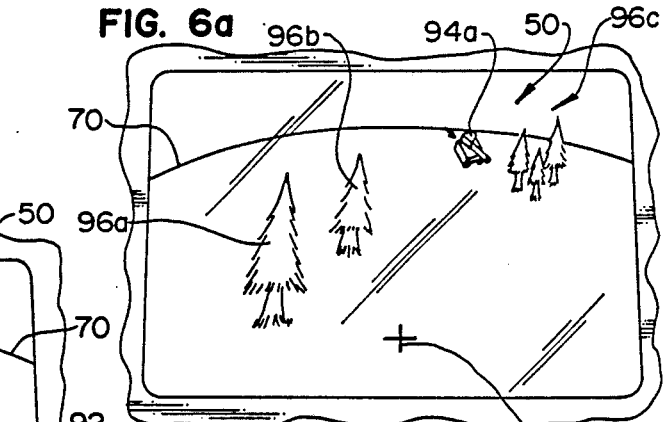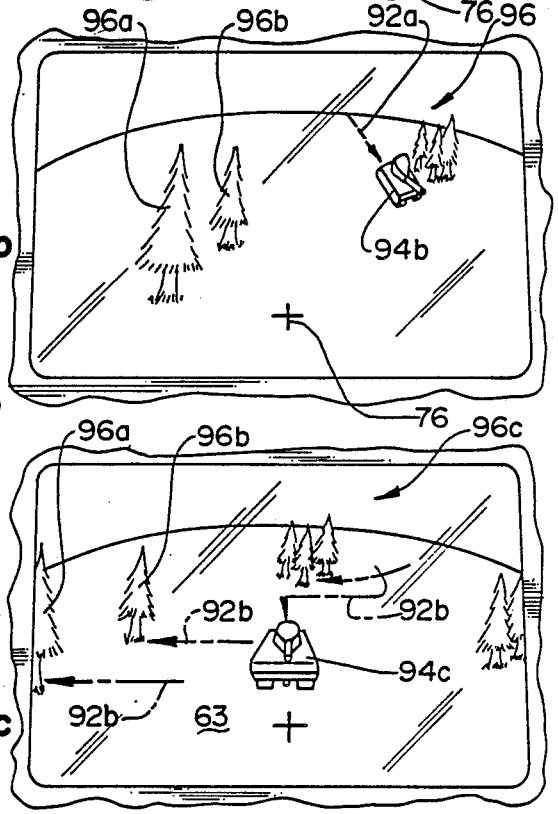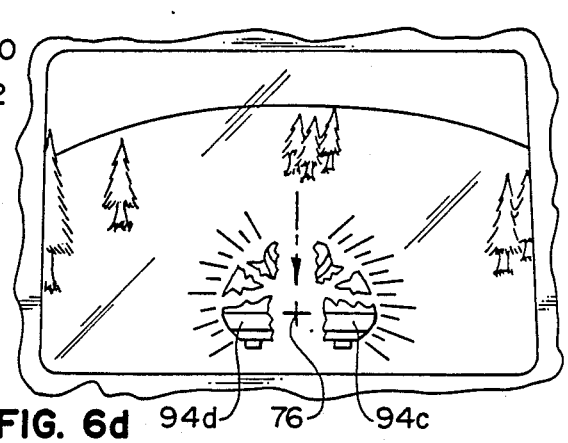

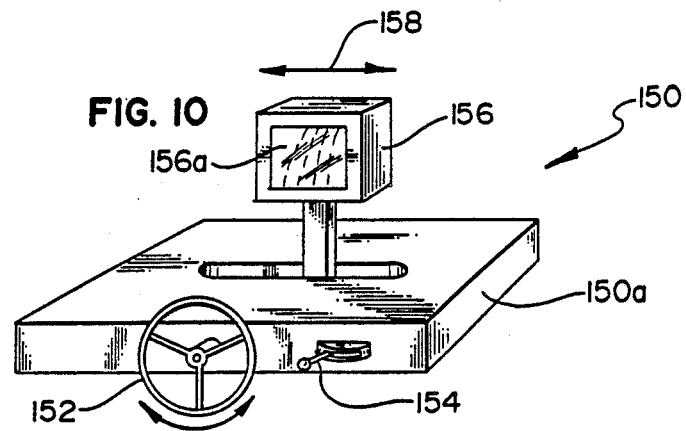
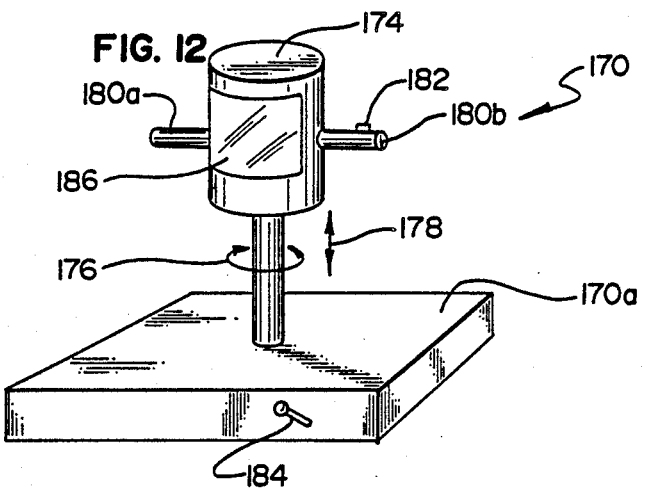
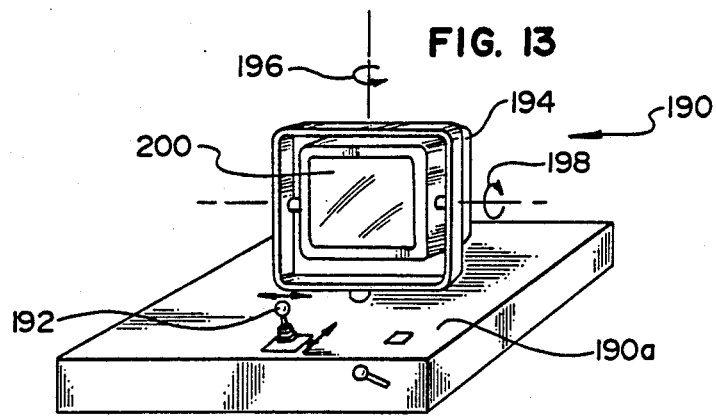

FIG. 11
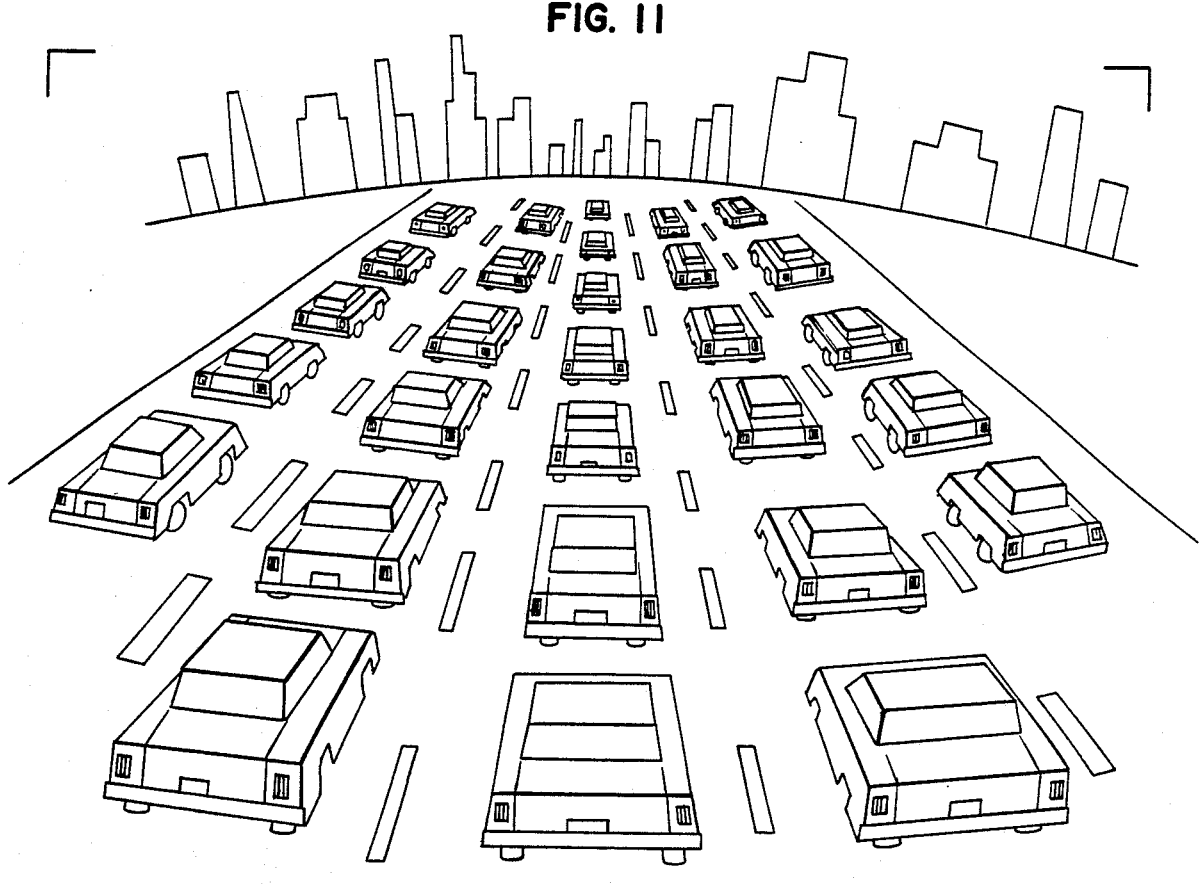
DEFENSIVE DRIVING GAME
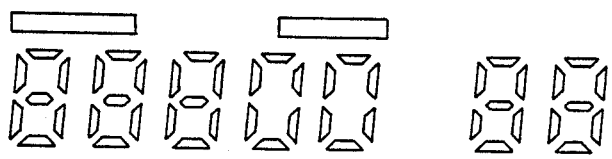

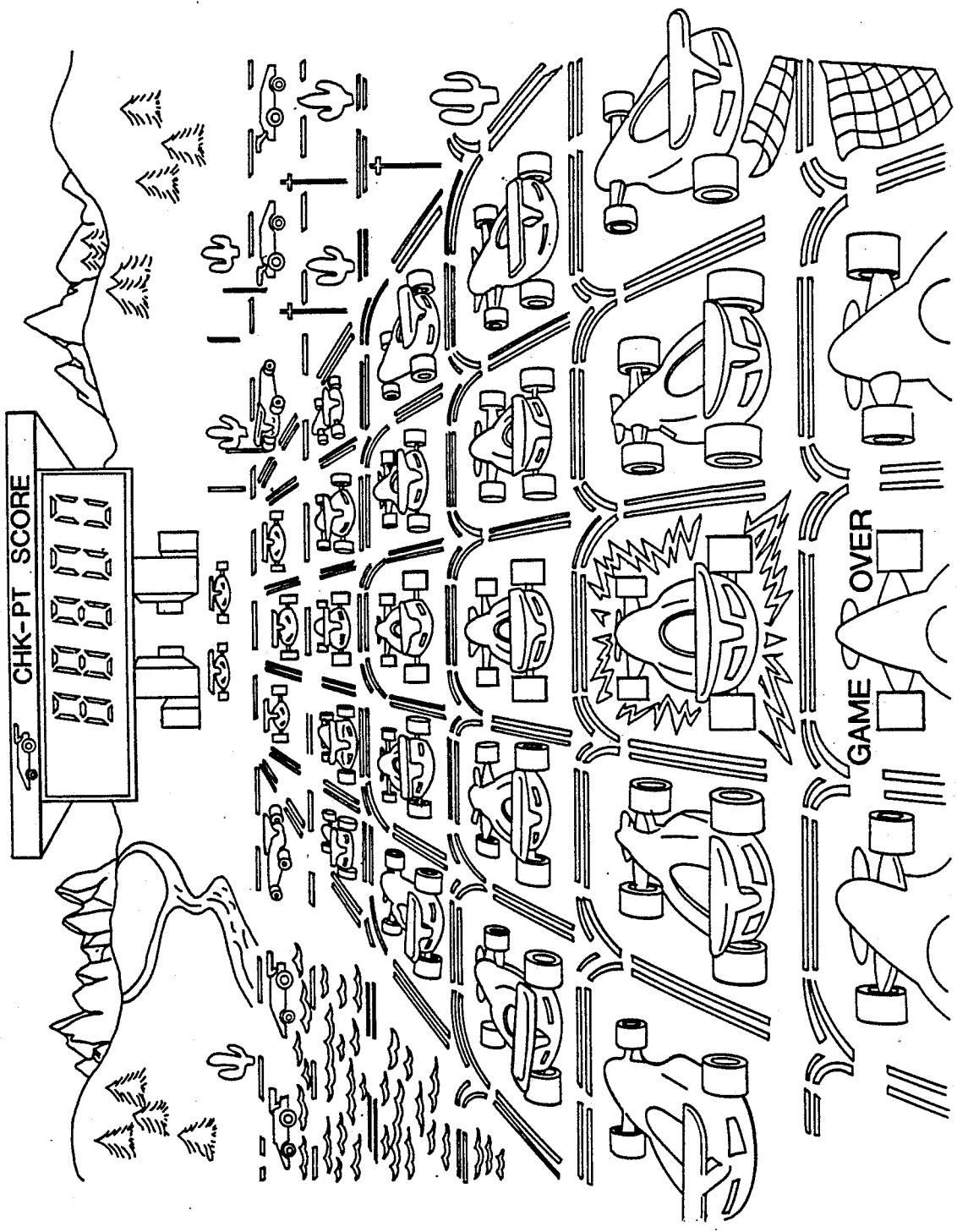

INTERACTIVE VIDEO GAME

FIELD OF THE INVENTION

The present invention pertains to interactive video games. More particularly, the present invention pertains to an interactive video game having a physically moveable display and images that move on the display directionally in response to the player's body physical position and direction thereof.

BACKGROUND OF THE INVENTION

Video games have become well-known and are very popular. Such games usually include a video display which is driven by electronic control circuitry. Operator interaction with the game is provided by means of buttons, joysticks, steering wheels or similar types of manually operable devices. These devices are usually connected to the electrical control circuitry and provide play altering inputs to that circuitry.

Video games typically use a spatially fixed display. The images move on the display in response to preprogrammed play sequences which can be altered by the operator manipulatable controls.

Each type of video game has a different objective. For example, in some games, the objective is to move a selected indicium past obstacles and through a maze. In other games, the objective is to win points, and a greater score, by launching projectiles from a selected indicium. The projectiles, representative of rockets, or bullets, are directed at "hostile" indicia that may be approaching from a variety of directions.

There are two general classes of video games. One is the arcade-type. The other is the home-type. Arcade-type games usually have a coin box and require that a coin be deposited to initiate a play sequence. The home-type games usually do not have a coin box. A play sequence can be initiated merely by pushing a button.

Most arcade type video games tend to be fairly large free-standing units. Such games are usually equipped with a large display which enables a complex set of images to be projected and contributes to the enjoyment of the game player However, such displays by their nature tend to be spatially fixed.

Home-type video games are usually smaller physically. Home-type games often utilize a standard television set for the display. Such games usually include an electronic control unit with operator controls such as switches or joy sticks attachable thereto. The control unit is in turn coupled to the television set. The television set is usually stationary during the game.

Neither of the above-noted types of games are readily portable There continues to be a need for readily portable games of the video type which provide enhanced displays so as to increase the enjoyment of playing the game.

SUMMARY OF THE INVENTION

In accordance with the invention, an interactive apparatus is provided which includes a housing moveable in at least one direction. Switches are provided, coupled to the housing to sense movement of the housing A display is carried by the housing for displaying a relatively moveable indicium or indicator. A control system is coupled to the sensing switches and the display to control the relative location and movement of the indicium on the display at least in part in response to the sensed movement, or position of the housing.

Further in accordance with the invention, the housing can be formed having a first part and a second part. The second part can be relatively moveable with respect to the first part The sensing switches can then sense the location of the first part with respect to the second part.

As the indicium is moved across the display by the control system, its location on the display can be altered by moving the housing in at least the one direction. Further, the control system can increase the size of the indicium so as to create an impression of an object moving from a first part of the display, relatively distant from the player, toward a second part of the display closer to the player.

A manually controllable switch is provided to enable an operator to generate an image obliterating event. That event takes place when the image enters a selected region of the second part of the display simultaneously with the event initiating switch being closed. The operator has an opportunity to move the housing so the image will move into the selected region of the display. The operator can then obliterate the image and receive a score increase by manually closing the provided switch.

Further in accordance with the invention, a plurality of images can be displayed simultaneously. The images move from the first part of the display toward the second part of the display. The control circuitry can simultaneously change the position of all of the displayed images in response to displacement of the housing.

The operator can displace the housing from one position to another thereby causing members of the group of images to be displayed, one at a time, in the selected region of the display. Once each member of the group of images has been moved into the selected region of the display, the operator can obliterate that image by manually closing the provided switch.

A success is indicated both visually and audibly. The player's score is also incremented.

The game keeps track of player failures to stop an approaching image. In a given play sequence, the player is permitted a predetermined number of failures. In the event that the operator is unable to move each image into the selected region and close the switch fast enough, a play failure occurs. The game sequence stops if the predetermined number of allowed failures is exceeded. In this event, the operator must initiate a new sequence to continue the game.

Further, in accordance with the invention a method is provided of controlling a visual image on display. The method includes the steps of:
displaying the image on a first part of the display;
moving the image toward a second part of the display;
detecting relative position of the display; and
altering the location of the image on the display in response to the detected relative position.

The method can also include altering the size of the image. As the image moves toward a selected region of the display its size can be increased. As the image moves away from the selected region, its size can be decreased.

Numerous other advantages and features of the present invention will become readily apparent from the following detailed description of the invention and the embodiments thereof, from the claims and from the accompanying drawings in which the details of the invention are fully and completely disclosed as a part of this specification.

BRIEF DESCRIPTION OF THE DRAWINGS

FIGS. 5A, 5B and 5C taken together illustrate various steps in a play sequence;

FIGS. 6A, 6B, 6C and 6D taken together illustrate the steps of an alternate play sequence;

FIG. 10 is an overall pictorial diagram illustrating, as an alternate embodiment, a driving game in accordance with the present invention;

FIG. 11 is a view of a plurality of images displayable on a display of the driving game of FIG. 10;

FIG. 12 is an overall pictorial diagram illustrating, as an alternate embodiment, a submarine game in accordance with the present invention; and FIG. 13 is an overall pictorial diagram illustrating as an alternate embodiment, a flying game in accordance with the present invention.

FIG. 14 is an alternate plurality of images displayable on the display of the driving game of FIG. 10.

DETAILED DESCRIPTION OF THE PREFERRED EMBODIMENTS

Figure 1:
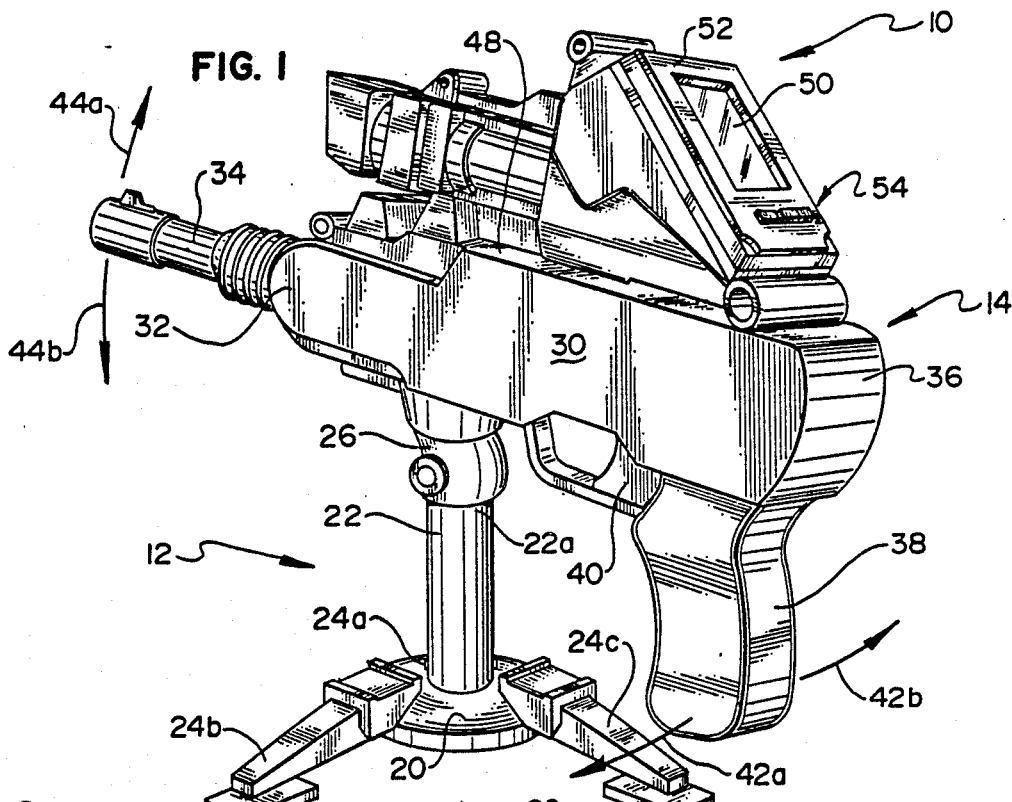
FIG. 1 is an overall perspective view of a game in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates an overall view of a game 10 in accordance with the present invention. The game 10 has a pedestal or base portion 12. Supported by the pedestal or base portion 12 is a gun shaped housing 14.

The pedestal or base portion 12 includes a generally disk shaped cylindrical central region 20 which carries an elongated cylindrical tubing support member 22. The disk shaped base portion 20 is stabilized by three spaced-apart leg extensions 24a, 24b and 24c.

An upper end 22a of the cylindrical member 22 carries a connecting joint 26. The connecting joint 26 can assume a variety of shapes Its exact structure is not a limitation of the present invention. The connecting joint 26 moveably couples the gun member 14 to the base portion 12.

The gun 14 includes an elongated housing 30 which supports at a first end 32 an elongated generally cylindrical barrel portion 34. At a second end 36, the housing 30 carries an operator grippable handle and a manually moveable trigger member 40.

An operator or game player can grip the handle 38 and move the gun 14 along a first arc indicated by arrows 42a and 42b. The operator can also move the gun along a second arc indicated by arrows 44a and 44b.

The operator is thus able to move the gun 14 in three dimensions although that movement is constrained by the joint 26. In addition, the game 10 may be carried while a play sequence is under way.

The gun 14 has an upper surface 48 on the housing 30. A liquid crystal display 50, generally rectangular in shape, is carried on the surface 48 at a selected viewing angle. Adjacent the display 50 on a surface 52 is a plurality of operator actuatable switches 54.

It will be understood that within the context of the present invention, the shapes of the housing 30, the barrel 34 and the grip 38 are not limitations of the present invention. Similarly, the shape of the region of the surface 48 which carries the display 50 is also not a limitation of the present invention.

Figure 2:
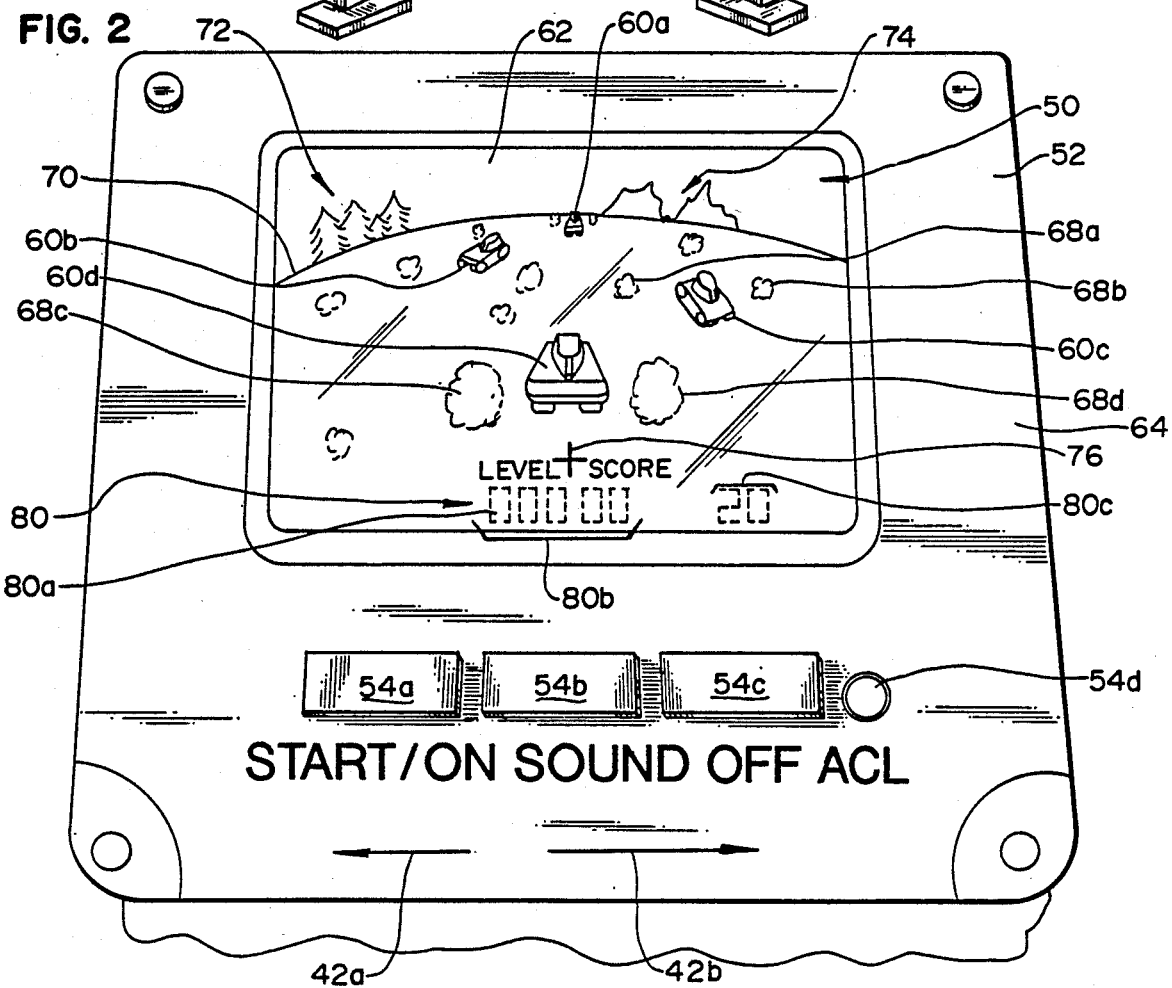
FIG. 2 is a planar view illustrating the display of the game of FIG. 1.

With respect to FIG. 2, the display 50 can be a liquid crystal display with a variety of differently shaped elements. The display 50 can include a plurality of displayable images 60. The members of the plurality 60a, 60b, 60c and 60d in accordance with one embodiment of the invention can be formed generally in the shape of moveable objects such as tanks.

As the images are displayed, startingfrom 60a, through 60b, 60c and 60d, the position of each of the images on display 50 varies along with the orientation of each image and along with the size thereof. A displayed image 60a which is near a region 62 of the display is of a relatively small size. A displayed image 60d near a middle region 64 of the display, is of a relatively larger size. The displayed images 60b and 60c are of an intermediate size between the small distant image 60a and the large close object 60d.

By alternately displaying different displayable images in a sequence it is possible using the display 50 to impart a feeling and an appearance that the image 60a is moving from an initial position in the region 62 to a final position in the region 64 corresponding to the image 60d. A game player is thus apparently viewing an approaching tank-like object. The increasing size of the image is consistent with daily experiences that most game players will have had. As images from a distance come closer, their apparent size increases.

In addition, the liquid crystal display 50 can also display a plurality of cloud shaped images 68. The plurality of cloud shaped images 68a, 68b, 68c and 68d can be associated with an adjacent member of the plurality of moveable images 60. The cloud shaped images of the plurality 62 can be displayed separately or in conjunction with the members of the plurality of moveable objects 60 to enhance the realism of and enjoyment of the game.

The display 50 can also provide an indicium of a horizon 70 from which the images move toward the region 64. Located on the horizon 70 are images of fixed objects such as a plurality of trees 72 and mountains 74.

In the region 64 of the display 50 is a permanently positioned and continuously viewable firing indicium 76. It is a primary object of the game to position the housing 50 such that the images 60a–60d of the plurality 60, sequentially move to the firing zone 76.

Once each member of the group of apparently approaching images, such as the members of the plurality 60, moves into the firing zone 76, the game player may obliterate it by depressing the trigger 40 in a timely fashion. If the closest displayed image, such as the image 60d in FIG. 2 is not obliterated quickly enough once it moves into the region 76, it can temporarily halt the game and terminate scoring.

Score can be kept in the game by means of a plurality of numerical digits 80 adjacent the firing zone 76. The region 80 can provide a play level indicator 80a as well as a set of score keeping digits 80b. An indicia 80c is provided for keeping track of the number of "shots" remaining for the player in each play sequence.

The manually operable buttons on the panel 52 include a start/on button 54a for the purpose of turning the game on and initiating a play sequence. A sound on/off button 54b alternately turns the play coordinated sound on and off during a game. An off button 54c terminates play and turns the game off. Finally, an accelerate button 54d is provided for the purpose of accelerating scrolling of the images on the display 50 during a game.

Figure 3:
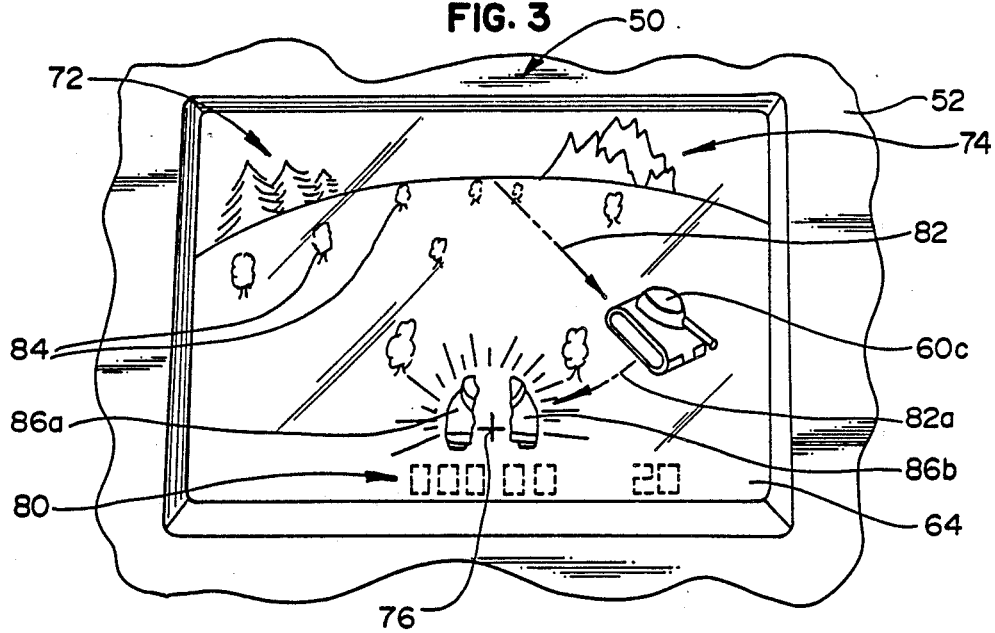
FIG. 3 is a planar view of the display illustrating a portion of the play sequence.

FIG. 3 illustrates a moveable object represented by the displayed image 60c. The displayed image 60c is oriented so as to appear to move in a direction 82. Apparent movement in the direction of 82 is accomplished by sequentially displaying images displaced along the line 82 having increasing size as the position of the respective image moves toward the region 64.

Various fixed elements 84 can be presented on the display to enhance the enjoyment of the game player. The game player succeed in obliterating an approaching object, such as the displayed image 60c by moving the display 50 in the direction 42a or 42b so as to superimpose the displayed image 60c closest to the region 64 on the firing region 76.

When the displayed image is so superimposed on the firing region 76 and the trigger member 40 is simultaneously depressed, the image will break apart in a realistically appearing fashion thereby displaying exploded members 86a and 86b. Simultaneously, audio circuitry within the housing 30 will generate an audio signal or sound corresponding to the explosion. At the same time the score keeping indicia 80b will be incremented indicating that a hit or a win has taken place.

Figure 4:
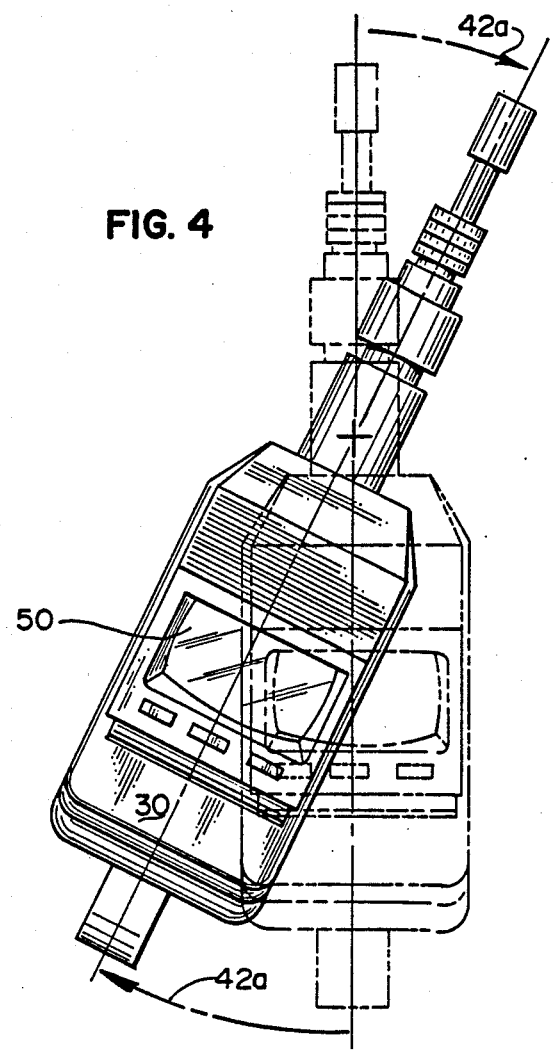
FIG. 4 is a top plan view of a portion of the game of FIG. 1 with an alternate position illustrated in phantom.

The image 60c which is oriented in the direction 82 can be caused to be superimposed on the hit region 76 by movement of the housing 30 which in turn moves the display 50. FIG. 4 illustrates movement of the housing 30 in the direction 42a thereby moving the display 50 and causing the image 60c, best illustrated in FIG. 3, to appear to move in a direction 82a permitting the object to be superimposed on the firing region 76.

FIGS. 5A–5C illustrate three steps of the method of displaying an image of an object centrally located in the display 50. In FIG. 5A, an image 90a is illustrated centrally located in the region 62 of the display 50. In FIG. 5B, an image 90b of the same object, but larger is illustrated in a central region 63 of the display 50.

The transition between the position of the image 90a of the object in FIG. 5A and the position of the image 90b in FIG. 5B along with the increased size of the image 90b presents the appearance of an object moving in the direction 92 toward the firing region 76. Finally, in FIG. 5C, the image is displayed at the firing region 76 and is illustrated breaking into two parts 90c and 90d illustrating a successful response by the player in depressing the trigger 40.

FIGS. 6A–6D illustrate movement of images the display 50 as a result of movement of the housing 30 which carries the display 50 in a direction 42a or a direction 42b. The display of FIG. 6A includes an image 94a oriented in a direction 92a.

In FIG. 6B an image 94b, is displayed. The image 94b has the same general shape as the image 94a and is oriented, in the direction 92a. Image 94b is larger than is image 94a. The images 94a or 94b are shown on the display 50 relative to stationary images such as trees 96a, 96b and a plurality of trees 96c.

In FIG. 6C, the image 94c is displayed centrally located in the region 63 of the display in response to movement of the display 50 in the direction 42b. In this regard, the fixed objects, trees 96a, 96b and 96c have also moved laterally as generally indicated by a direction 92b. The image 94c of the object is bigger than the image 94b.

Finally, in FIG. 6D, the image is displayed at the firing zone 76. In response to the operator having depressed the trigger 40 the image is displayed has broken apart into sections 94d and 94e. The break up of the image into the sections 94d and 94e confirms a successful interaction on the part of the player and will result in an increase of the player's score.

Figure 7:
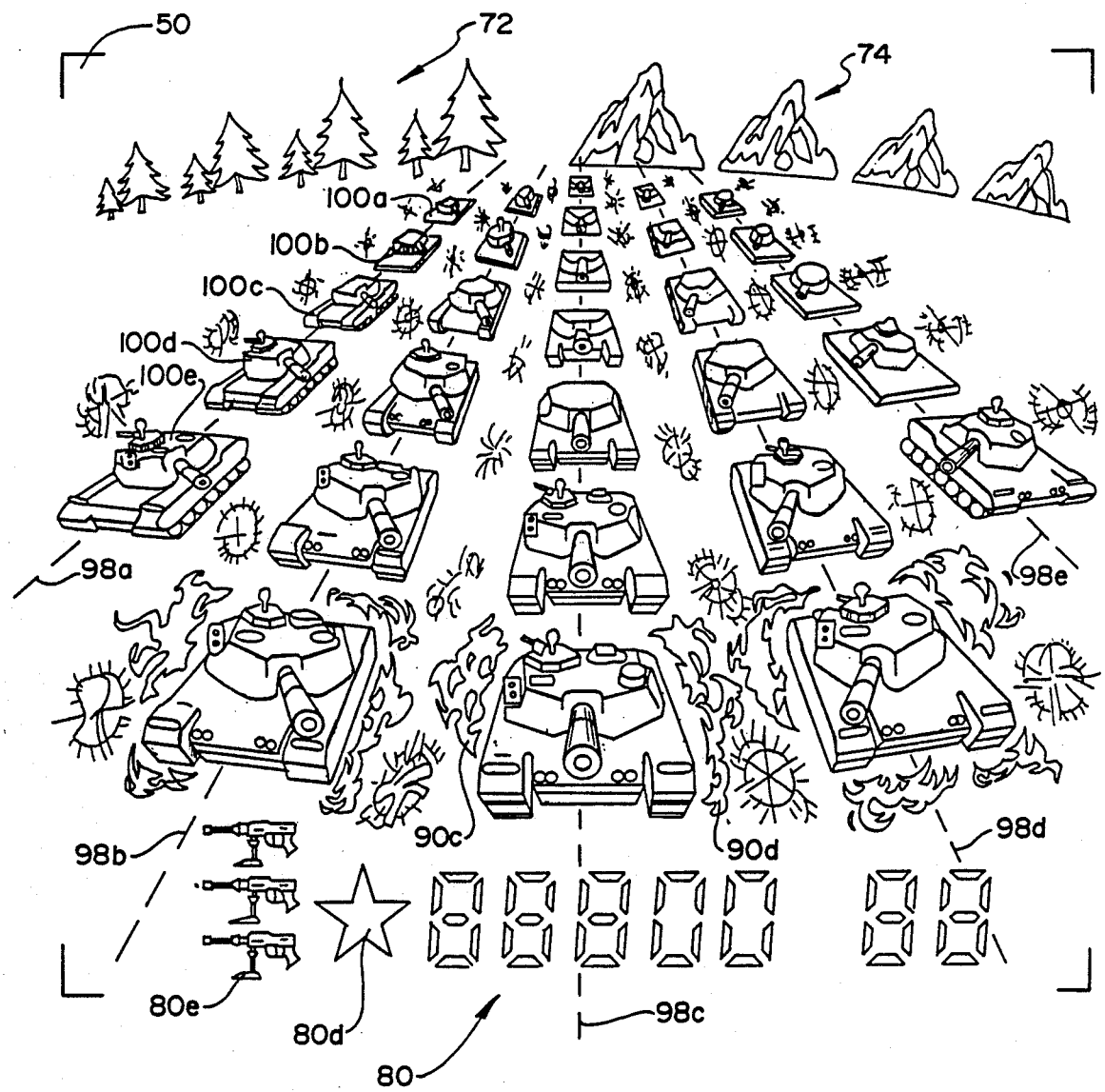
FIG. 7 illustrates a plurality of all of the images displayable on the display of FIG. 2.

FIG. 7 illustrates the display 50 with all of the images simultaneously illuminated. As is illustrated in FIG. 7, the display 50 can display a plurality of tank like images which can be scrolled to apparently advance an object along radially directed lines 98a, 98b, 98c, 98d and 98e.

Further as can be seen from FIG. 7, the images, such as the images 100a, 100b, 100c, 100d and 100e increase in size as they move along the radial 98a toward the firing region 76 Images which are displayed along the radials 98a or the radials 98b can be moved onto the radial 98c by moving the display 50 in the direction 42a. Similarly, images which are displayed on the radials 98e and 98d can be moved onto the radial 98c in response to movement of the display 50 in the direction 42b. The fixed objects such as trees 72 and mountains 74 are also illustrated in FIG. 7.

In addition to the images representative of moving objects, indicia 80d can be displayed illustrative of the skill level of the game player.

A plurality of chance indicia 80e indicate the number of chances or failures, described above, still available to a player in the present play sequence. After three failures, the current play sequence terminates.

Figures 8A, 8B:
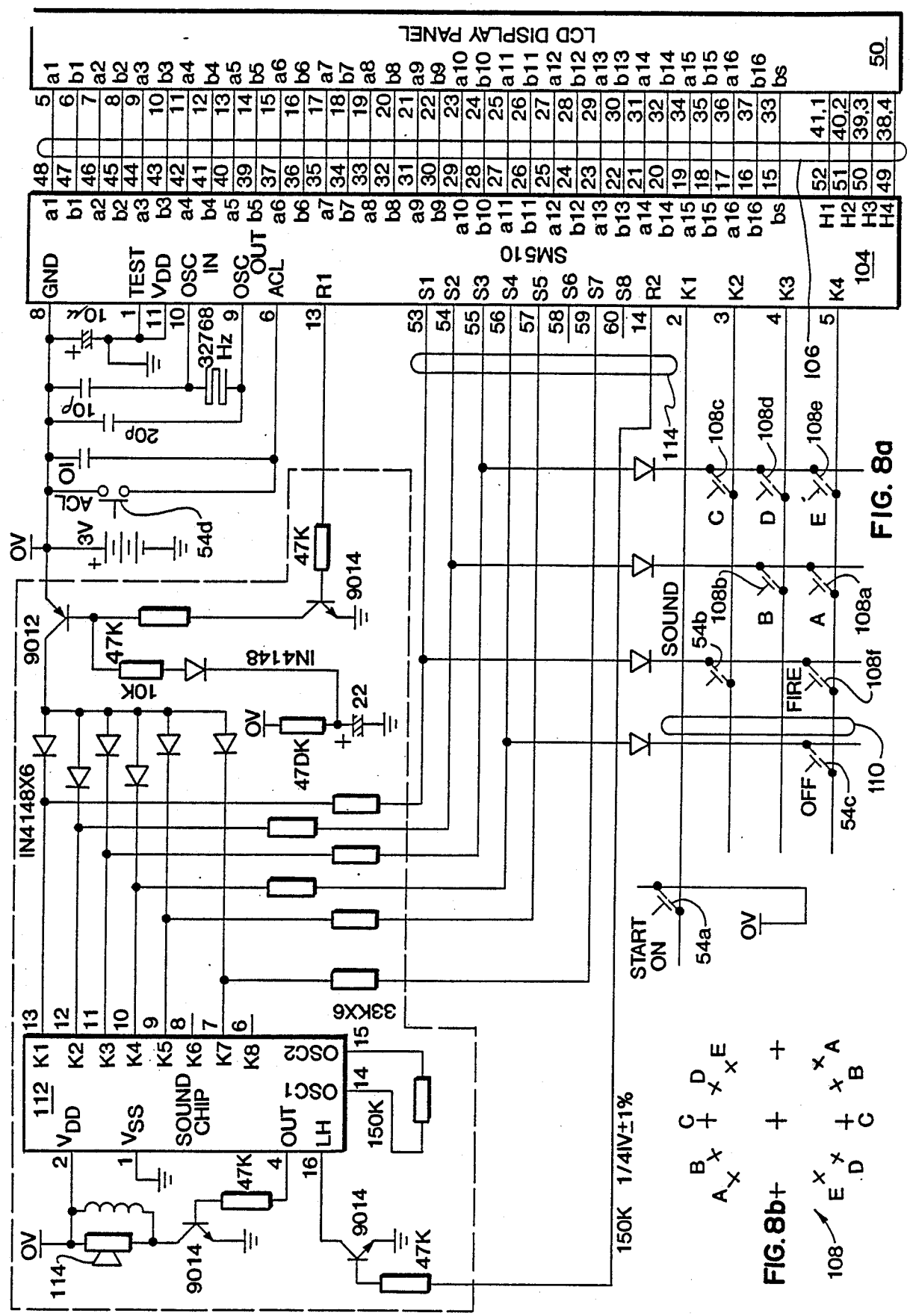
FIG. 8A is a schematic diagram of an electronic circuit for controlling the game of FIG. 1.
FIG. 8B is a schematic diagram illustrating rotary switch positions of the supporting cylinder of the game of FIG. 1.

FIG. 8A is an electronic schematic of an electronic system 102 usable to implement the previously described scrolling displays. The electronic system 102 includes a Sharp SM510 microcomputer 104. The microcomputer 104 includes both random access and read-only memory The microcomputer 104 is coupled to the input lines 106 of the liquid crystal display 50 as is conventional. The microcomputer 104 can detect the relative position of the gun 14 with respect to the base 12 by means of a plurality of position identifying switches 108 indicated schematically in FIG. 8B.

Switch 108a, when closed, identifies the position of the gun 14 as being at location A with respect to the base 12. Similarly, each of switches 108b, 108c, 108d and 108e respectively when closed, identifies the position of the gun 14 with respect to the base 12 as being at locations B, C, D or E. The switches 108a through 108e are coupled to the processor 104 by means of four parallel input lines 110. In addition, a switch 108f which is mechanically operated by the trigger 40 is also coupled to the input lines 110. The switches 54a, 54b and 54c are also coupled to the processor 104 through the input lines 110.

It will be understood that while switches 108a through 108e can be used to specify the position of the gun 14 with respect to the base 12 in response to movement in the directions 42a and 42b, that a corresponding set of switches, not illustrated, could be used to specify the position of the gun 14 with respect to the base 12 in response to movement in the direction 44a and 44b. The additional set of switches could also be interfaced to the computer 104 via the lines 110.

An audio generator 112 is coupled to a set of parallel output lines 114 of the computer 104. The audio generator can be implemented as a type HT-88P sound generating ship from Holtek Semiconductor, Inc. The sound generator 112 can generate a variety of sounds including tones, booms, noise or explosions under control of the computer 104. The sound generator 112 is coupled to an audio output device such as a speaker 114.

The accelerate button 54d can be used to generate a reset signal to the computer 104 for the purpose of increasing the rate of scrolling the display 50.

Figure 9A:
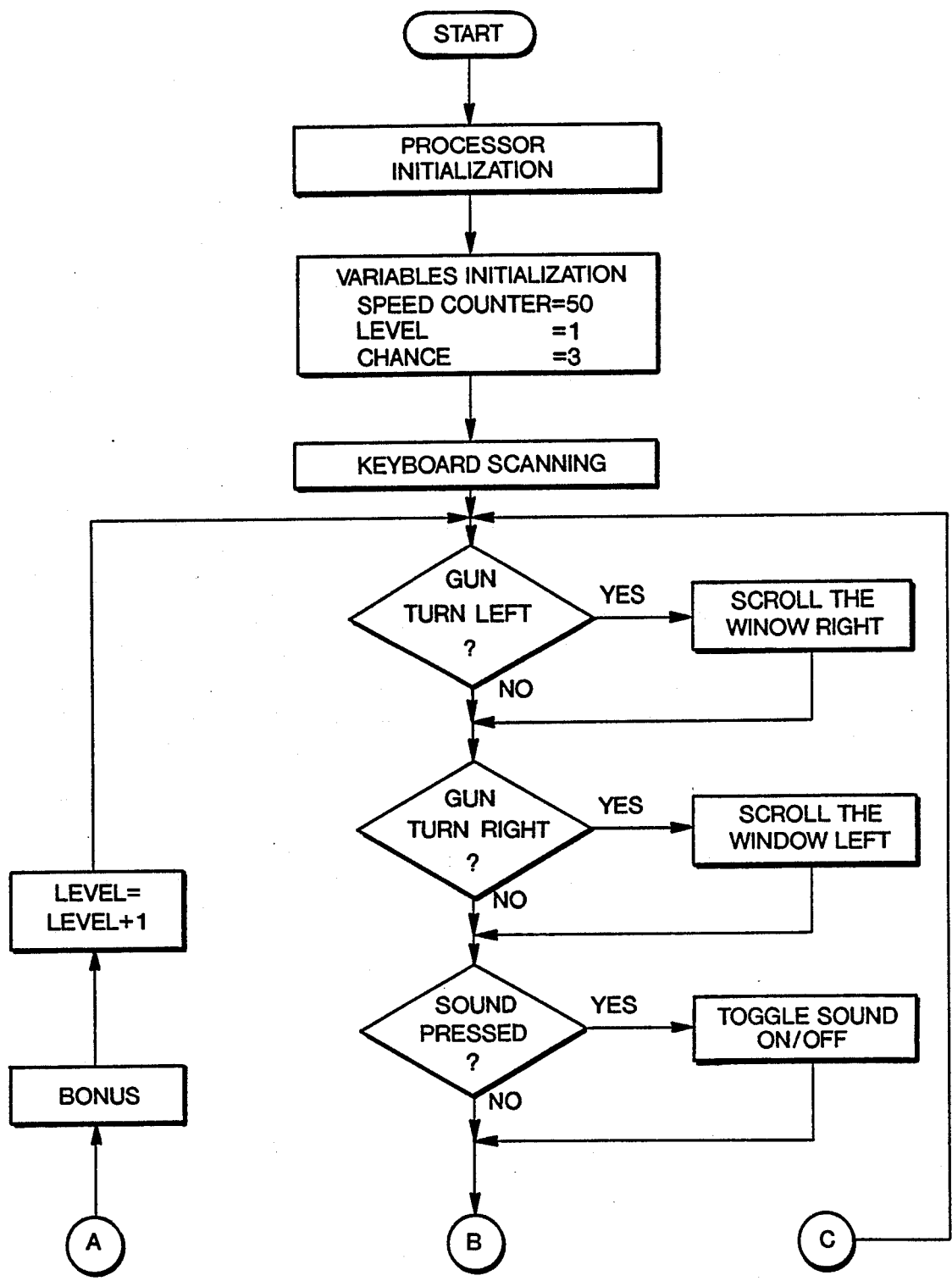
FIGS. 9A, 9B and 9C taken together are a flow diagram illustrating operation of software usable with the electronic circuitry of FIG. 8A.
Figure 9B:
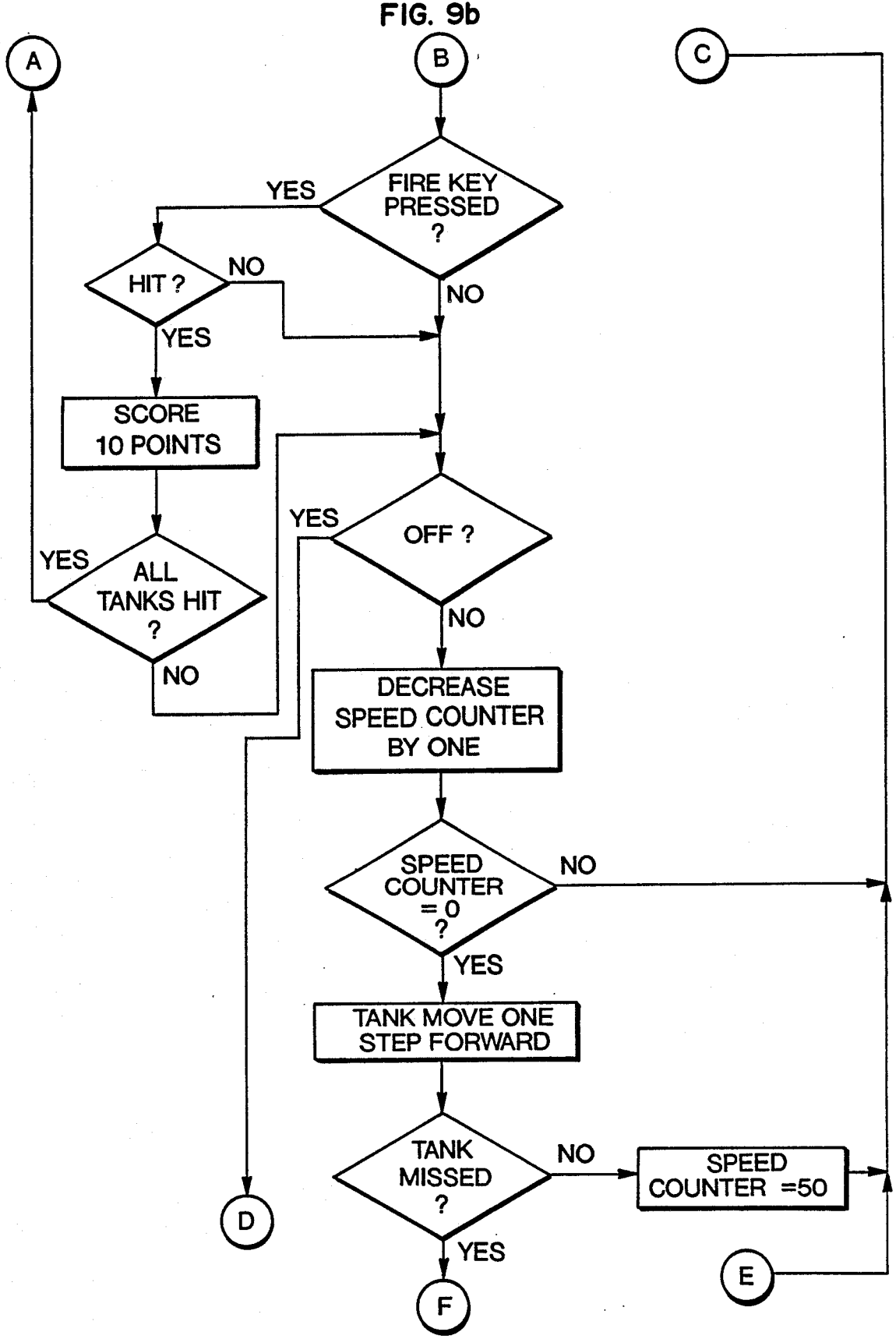
Figure 9C:
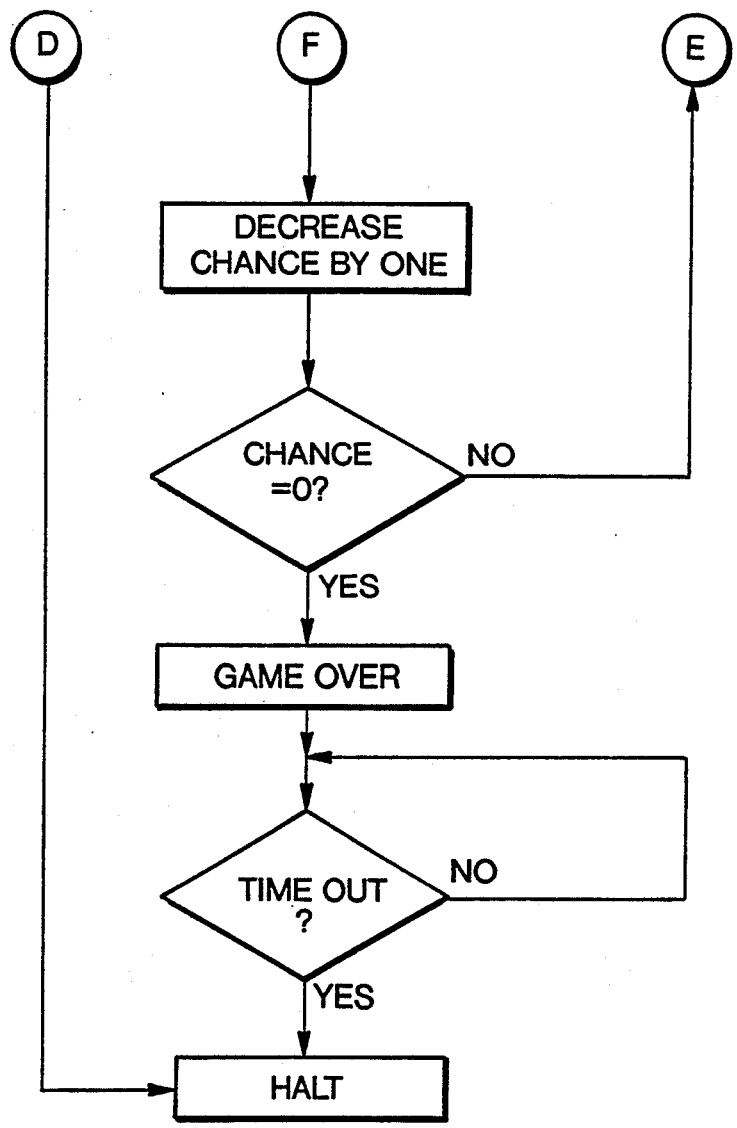

FIGS. 9A, 9B and 9C are a flow diagram illustrating the steps of a computer program usable with the computer 104 for the purpose of detecting the position of the gun 14 with respect to the base 12, detecting the condition of the switches 54, as well as the position switches 108 and the trigger 40. In accordance with the flow diagram of FIGS. 9A, 9B and 9C, a player is given three opportunities or chances corresponding to indicia 86d, to obliterate or destroy approaching images.

Each time an approaching image is missed by the operator after it gets within a predetermined distance of the firing zone 76, the chance indicium is reduced by 1. When the chance indicium is reduced to zero, the game is over and needs to be restarted.

It will be understood with respect to the embodiment of the invention illustrated herein that a variety of other displays and games can be implemented without departing from the spirit and scope of the present invention. For example, instead of a plurality of approaching tank-like objects, the display 50 can be used for the purpose of displaying ships and torpedoes directed toward such ships.

Alternately, the display 50 could be used to implement a display of moving objects in lanes, such as vehicles, with the control being not a trigger but a form of steering mechanism so as to move, within the display, between moving vehicles. In yet another alternate, the display 50 can be used to display approaching or departing aircraft for purposes of safely landing on a selected site, for example.

Alternately, the display 50 could present the display from an airplane cockpit. Approaching or attacking aircraft could be displayed. The control, which would be a three dimensional control such as a joy stick, could be used to control visual perspective viewed from the liquid crystal display. Horizon indication could be changed as well as distance or attitude with respect to attacking aircraft.

FIG. 10 is an overall pictorial diagram of a safe driving game 150 utilizing the principles of the previously described game 10. A base 150a supports the game 150. In FIG. 10 a steering wheel 152 is provided for control purposes. The steering wheel 152 can be rotated as is conventional with steering wheels. In addition, a velocity or speed lever 154 is also provided. The game 150 carries a housing 156 for a display 156a which is movable laterally in directions 158 in response to rotating the steering wheel 152.

As the steering wheel is rotated, the images on the display 156a change in accordance with movement laterally of the housing 156.

FIG. 11 illustrates all of the images displayable on the display 156a as the game proceeds The images displayable on the display 156a include a plurality of vehicles oriented away from the surface of the display 156a. As the vehicles move away from the surface of the display they get smaller.

Hence, it's possible to create a scrolling display on the unit 156 which corresponds to a driver at the steering wheel 152 passing various vehicles. Provision is also included in the display elements of FIG. 11 also include score keeping elements. The score keeping elements can change dynamically as the driver safely avoids moving obstacles in the 4-lane highway. The images are scrolled toward the front edge of the display.

FIG. 12 is an overall pictorial view of a submarine game 170. The game 170 is a ship hunting game.

The game 170 has a base portion 170a on which is carried a vertically oriented supporting cylinder 172. The supporting cylinder carries a cylindrical periscope member 174 which can be moved in a rotary direction 176 or a vertical direction 178. The periscope member 174 carries laterally extending control handles 180a and 180b.

On control handle 180b is a firing control button 182. Further, the cylindrical member 174 carries a liquid crystal display 184 usable to display torpedos and/or ship images during a ship hunting game sequence.

A velocity lever 184 is also provided on the game 170. The display 186 can be used to display a plurality of ship images. Alternately, the display 186 can be used to display a plurality of torpedo images.

FIG. 13 is an overall view of a flying game 190. The flying game 190 has a base portion 190a. Carried on the base portion 190a is a directional lever 192 for control purposes. The directional lever 192 is usable to control the location of a display unit 194.

It will be understood that the lever 192 could have various shapes The exact shape thereof is not a limitation of the present invention.

The display unit 194 is rotatable in a generally horizontal plane 196 as well as simultaneously rotatable in a generally vertical plane 198. The display unit carries a displayable region 200 upon which images corresponding to images of the type previously discussed can be displayed. The images on the display 200 can be images of airplanes approaching and departing from the airplane cockpit represented by the game 190.

Figure 15:
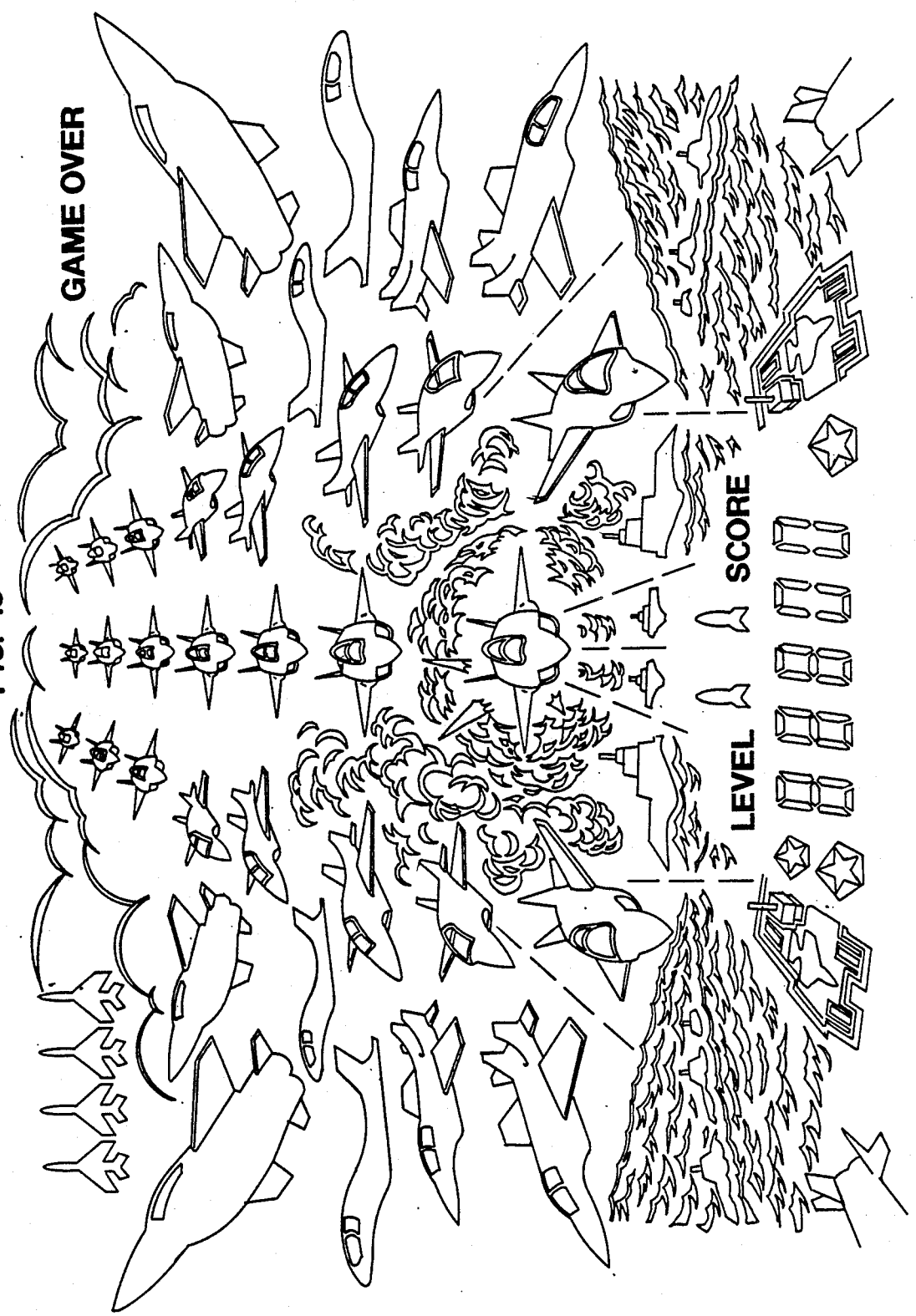
FIG. 15 is a review of a plurality of images displayable on a display of the flying game of FIG. 13.

FIG. 14 is an alternate display usable with the driving game of FIG. 10. FIG. 15 is a display usable with the flying game of FIG. 13.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. An interactive apparatus, usable by an operator located outside of same, comprising:
   a housing movable by the outside operator in at least a first direction;
   means for sensing said movement;
   means, carried by said housing, for displaying a relatively movable indicium;
   means, coupled to said sensing means and said display means, for controlling relative location and movement of said indicium on said display at least in part in response to said sensed movement.

2. An interactive apparatus as in claim 1 with said housing formed of a first part and a second part, said second part being relatively movable with respect to said first part.

3. An interactive apparatus as in claim 2 with said sensing means including means for detecting movement of said second part with respect to said first part.

4. An interactive apparatus as in claim 2 with said sensing means including means for detecting the position of said second part with respect to said first part.

5. An interactive apparatus as in claim 1 with said display means including a two dimensional visual display region.

6. An interactive apparatus as in claim 1 with said control means including means for generating time varying, position dependent electrical signals, also coupled to said display means, for displaying said moving indicium with a changing size as a function of time.

7. An interactive apparatus as in claim 1 with said control means including means for generating time varying, position dependent electrical signals, also coupled to said display means, for displaying said moving indicium with a continually increasing size representing a relatively approaching object.

8. An interactive apparatus as in claim 1 including manually operable means, coupled to said control means, for initiating selected events.

9. An interactive apparatus as in claim 8 with said control means including means for sensing said selected events and for altering said display in response thereto.

10. An interactive apparatus as in claim 9 with said altering means including means for changing a dimensional parameter of said indicium.

11. An interactive apparatus as in claim 10 with said changing means including means of increasing the overall size of said indicium.

12. An interactive apparatus as in claim 11 with said increasing means including time dependent means for increasing the overall size of said indicium.

13. An interactive apparatus as in claim 12 with said time dependent means including means for moving said indicium from a first to a second part of said display means simultaneously with increasing said overall size of said indicium and including means for creating an image of said indicium which, as a function of time, appears to be approaching said second part.

14. An interactive apparatus as in claim 12 with said time dependent means including means for moving said indicium from a first to a second part on said display means simultaneously with decreasing said overall size of said indicium and including means for creating an image of said indicium which, as a function of time, appears to be departing said second part.

15. An interactive apparatus as in claim 11 with said increasing means including time dependent means for decreasing the overall size of said indicium.

16. An interactive apparatus as in claim 10 with said changing means including means of decreasing the overall size of said indicium.

17. An interactive apparatus as in claim 10 with said changing means including means for increasing and decreasing the overall size of said indicium in response to said sensed movement and at least one time varying electrical signal generated by said control means.

18. An interactive apparatus as in claim 1 with said control means including a microcomputer.

19. An interactive apparatus as in claim 1 with said display means including a liquid crystal display.

20. An interactive electrically powered unit for displaying an operator alterable event sequence, the operator being located externally of the unit, comprising:
   support means having a first part relatively movable, by the externally located operator, with respect to a second part with said second part not moving relative to the operator;
   electrically actuated display means carried by said first part;
   means, carried by said first part, for sensing position of said first part with respect to said second part;
   manually operable means carried by said first part for generating an intermittent event altering indicium in response to manual actuation thereof by the externally located operator thereof;
   control means, coupled to said display means, said sensing means and said manually operable means, for generating display activating, electrical signals in response to which a display indicium, relatively movable with respect to said display means, is formed thereon with said movement being altered by at least said sensed relative position of said first and second parts and by said event altering indicium.

21. An interactive unit as in claim 20 with said control means including means for altering both size and position of said display indicium as said indicium moves from a first portion of said display means toward a second portion thereof.

22. An interactive unit as in claim 20 with said display means including a predefined region for terminating display of said display indicium.

23. An interactive unit as in claim 22 with said control means including means for detecting a simultaneous occurrence of said display indicium in said display terminating region and an occurrence of said event altering indicium from said manually operable means.

24. An interactive unit as in claim 22, including further, means for generating an audio indicium indicative of said simultaneous occurrence.

25. A method of controlling a visual image on a display which is being viewed by an operator comprising:
   displaying the image on a first part of the display;
   moving the image toward a second part of the display,
   manually moving the display from a first position to a second position;
   detecting relative position of the display and
   altering the location of the image thereon in response thereto.

26. A method as in claim 25 including changing the size of the image while it is being moved so as to present the appearance of an object moving closer.

27. A method as in claim 25 including moving the image at a predetermined rate.

28. A method as in claim 25 including displaying at least one additional fixed image.

29. A method as in claim 25 wherein the image increases or decreases in size as the image moves from the first part to the second part.

30. An interactive apparatus usable by an outside operator comprising:
 means for supporting a selected member;
 electrically actuated display means carried by said supporting means and movable relative thereto by the outside operator;
 manually operable input means, usable by the outside operator, for effecting movement of said display means from a first position to a second position;
 control means, coupled to said display means and said input means, for generating image forming electrical signals for said display means including means for displaying an image based at least in part on said relative location of said display means with respect to said supporting means.

31. An interactive apparatus as in claim 30 including means for sensing relative location of said display means with respect to said supporting means.

32. An interactive apparatus as in claim 31 with said sensing means including means for detecting the position of said display means with respect to said supporting means.

33. An interactive apparatus as in claim 31 with said image forming signals forming a moving image on said display means with said control means including means for varying said signals so as to move said image in a first direction from an initial location toward a final location on said display means.

34. An interactive apparatus as in claim 33 with said signal varying means including means responsive to said relative location for varying said signals in response thereto thereby presenting a visual image appearing to move toward a selected region of said display means.

35. An interactive apparatus as in claim 34 with said visual image movable in a second direction, different from said first direction, in response to changing relative location.

36. An interactive apparatus as in claim 35 with said second direction being oriented generally transversely with respect to said first direction.

37. An interactive apparatus as in claim 30 with said control means including means for generating electrical signals corresponding to a fixed indicium on said display means.

38. An interactive apparatus as in claim 30 with said control means including a microcomputer.

39. An interactive apparatus as in claim 38 with said display means including a liquid crystal display.

40. An interactive activity apparatus usable by an external operator comprising:
 a closed housing;
 means supporting said housing for relative motion therewith;
 sensing means for providing electrical signals indicative of a position of said housing relative to said supporting means;
 electrically actuated means, carried by said housing for displaying selected indicia in response to applied control signals;
 a manually operable control member, carried by said housing outside thereof, for relatively moving at least said display with respect to said supporting means, including manually operable, event actuating means for generating at least a selected control signal; and
 control means coupled to said sensing means, to said display means and to said event activating means, for detecting said relative location, for generating time varying indicia displaying control signals in response at least to said relative position and for altering relative position of at least one of said indicia as said relative position changes.

41. An apparatus as in claim 40 with said control means including means for moving at least one indicium over a period of time in a first direction and for moving said indicium in a second direction in response to relative motion between said housing and said supporting means.

42. An apparatus as in claim 41 with said movement in said first direction being simultaneous with said movement in said second direction.

43. An apparatus as in claim 41 with said control means including means for generating indicium displaying time varying electrical actuation signals for moving said displayed indicium from a first region of said display means, in a first direction, at a selected rate and for moving said displayed indicium in said second direction toward a predetermined region of said display means.

44. An apparatus as in claim 43 with said control means including means for detecting a simultaneous occurrence of said indicium being present in said predetermined region and said generated selected control signal.

45. An apparatus as in claim 44 with said control means altering said displayed indicium in response to said detected simultaneous occurrence.

46. An apparatus as in claim 40 with said control means including means for generating control signals for displaying simultaneously a plurality of movable indicium.

47. An apparatus as in claim 46 with said members of said plurality each relatively movable in a first direction.

48. An apparatus as in claim 47 with at least some members of said plurality changing size while moving in said first direction.

49. An apparatus as in claim 48 with said control means including means for enlarging the size of at least one member of said plurality while said member moves in said first direction.

50. An interactive video game usable by an external player comprising:
 a closed housing;
 means for supporting said housing and moveable relative thereto;
 display means carried by said housing on an external surface thereof, for selectively displaying a plurality of spaced-apart visible images with at least some of said images aligned along a linear direction on said display with said some images having a size that increases in a predetermined fashion along said linear direction;
 means for sensing position of said housing with respect to said supporting means;
 control means, coupled to said display means and said sensing means, for making selected images visible on said display means including means for visibly displaying in succession said some images so as to present an appearance of a selected object, corresponding in shape to one of said some images, moving on said display while simultaneously changing size; and a manually operable control member attached to and, at least in part, outside of said housing usable to move said display means and said housing thereby altering the relative location of visible image on said display with respect to said supporting means.

51. An interactive video game as in claim 50 with said control means including programmed data processing means.

52. An interactive video game as in claim 50 with said display means including a liquid crystal display.

53. An interactive video game as in claim 52 wherein said liquid crystal display carries at least one plurality of linearly spaced-apart visually observable images similar to one another except in size with said plurality extending across at least one region of said display.

54. An interactive video game as in claim 53 with said liquid crystal display carrying at least a second plurality of linearly spaced-apart visually observable images.

55. An interactive video apparatus manipulated by an external operator comprising:

a base member;

a support member movably carried on said base member and manually movable by the external operator with respect to said base member;

display means mounted on an external operator viewable surface of said support member;

means for generating images, on at least part of said display means, movable in response to the relative location of said display means with respect to said base member.

* * * * *